United States Patent [19]
Sasaki et al.

[11] Patent Number: 5,650,884
[45] Date of Patent: Jul. 22, 1997

[54] MAGNETIC RECORDING AND REPRODUCING APPARATUS HAVING A HIGH-SPEED CHANGEOVER

[75] Inventors: Hiroyuki Sasaki; Yasuhiko Tsuji; Sadakazu Murakami; Akinobu Kawamura, all of Kyoto, Japan

[73] Assignee: Rohm Co., Ltd., Kyoto, Japan

[21] Appl. No.: 400,987

[22] Filed: Mar. 8, 1995

[30] Foreign Application Priority Data

Mar. 8, 1994 [JP] Japan .................... 6-036697

[51] Int. Cl.$^6$ .................... G11B 5/09; G11B 15/12; G11B 5/02
[52] U.S. Cl. .................... 360/67; 360/46; 360/61; 360/68
[58] Field of Search .................... 360/61, 62, 66, 360/67, 68, 46, 64

[56] References Cited

U.S. PATENT DOCUMENTS

| | | | |
|---|---|---|---|
| 4,713,700 | 12/1987 | Kuwahara et al. | 358/315 |
| 4,965,681 | 10/1990 | Takimoto | 360/64 |
| 5,168,397 | 12/1992 | Iwamura et al. | 360/67 |
| 5,204,790 | 4/1993 | Yang | 360/68 |
| 5,357,379 | 10/1994 | Gower | 360/62 |

*Primary Examiner*—Aristotelis M. Psitos
*Assistant Examiner*—Regina Y. Neal
*Attorney, Agent, or Firm*—Nikaido Marmelstein Murray & Oram LLP

[57] ABSTRACT

A recording and reproducing apparatus of the present invention has a magnetic head used for both recording and reproduction. To perform the changeover between recording and reproduction in a short period of time, a first recording amplifier for supplying a recording signal is provided at one end of the magnetic head, a second recording amplifier for supplying a recording signal of a phase opposite to that of the recording signal supplied to the one end of the magnetic head is provided at the other end of the magnetic head, and a reproduction input amplifier connected to the both ends of the magnetic head is provided. The same bias voltages are supplied through first and second resistors connected to the both ends of the magnetic head.

7 Claims, 4 Drawing Sheets

MAGNETIC RECORDING AND REPRODUCING APPARATUS HAVING A HIGH-SPEED CHANGEOVER

BACKGROUND OF THE INVENTION

1. Field of the Invention

The present invention relates to a magnetic recording and reproducing apparatus such as a video tape recorder (VTR), and more particularly, to a magnetic recording and reproducing apparatus capable of high-speed changeover.

2. Description of the Prior Art

Referring to FIG. 1, there is shown a relevant portion of a magnetic recording and reproducing apparatus as shown by Japanese Laid-open Patent Application No. S63-108502. In this prior art, a magnetic head apparatus 50 used for both recording and reproduction has its one end connected to a power line 51 of a voltage Vcc and has its other end connected to the collector of a recording current supplying transistor 52. The both ends of the magnetic head apparatus 50 are further connected to input terminals of a reproduction input amplifier 53 comprising a differential amplifier. Reference numerals 54 and 55 represent differential transistor.

Reference numerals 56 and 57 represent recording/reproduction changeover switches. During recording, the switch 56 is ON and the switch 57 is OFF. During reproduction, the switch 56 is OFF and the switch 57 is ON. Since the direct current impedance at a coil L of the magnetic head apparatus 50 is low, the voltage at the collector side of the transistor 52, i.e. at a point a is a power source voltage Vcc for a circuit. Since the differential transistor 54 is activated by supplying a bias voltage from another bias source 59 by way of a resistor 60 to its base, the direct current voltages at the points a and b are different. For this reason, the points a and b are cut off from each other by a capacitor 58 with respect to direct currents.

For this reason, the changeover between recording and reproduction takes a long time in this prior art. For example, when a recording current flows into the magnetic head apparatus 50, at the point a, a recording voltage is generated with the direct current voltage Vcc at the point a as the center as shown in FIG. 2. If the recording voltage is cut off in the middle at a point c or d, the voltage varies until it returns from the voltage at the point to the voltage Vcc. At this time, since the capacitor 58 is present, the activation of the reproduction input amplifier 53 is delayed according to the time constant for the charging and discharging of the capacitor 58.

Since it is considered that the prior art of FIG. 1 is originally intended for a changeover on the order of approximately 60 μs, the speed of the changeover can be comparatively low. However, this prior art cannot be used when a high-speed changeover is required. For example, there is a format as shown in FIG. 3 in which different pieces of information A, B and C are recorded on each block area of each recording track 90 of a magnetic tape 91 and blank spaces G1 and G2 are provided therebetween. In this format, assuming that B is audio information, that C is video information and that an after recording of the video is performed, recording must be performed during the period of the information B and reproduction must be performed during the period of the information C.

At this time, the changeover from recording to reproduction must be made during the period of G2. Therefore, the time which can be used for the changeover is very short: at most 40 μs. Since the periods of G1 and G2 must be reduced as much as possible to increase the quantity of the information A, B and C, the changeover time is desirably on the order of approximately 10 μm. The above-described prior art can hardly be used in such a case.

SUMMARY OF THE INVENTION

An object of the present invention is to provide a magnetic recording and reproducing apparatus where the recording/reproduction changeover time is reduced.

To achieve the above-mentioned object, a magnetic recording and reproducing apparatus of the present invention is provided with a magnetic head used for both recording and reproduction, first recording signal supplying means for supplying a recording signal to a first end of the magnetic head, second recording signal supplying means for supplying to a second end of the magnetic head a recording signal of a phase opposite to a phase of the recording signal supplied to the first end of the magnetic head, a reproduction input amplifier connected to the first and second ends of the magnetic head, a first resistor connected to the first end of the magnetic head, a second resistor connected to the second end of the magnetic head and having a resistance value the same as a resistance value of the first resistor, and bias voltage supplying means connected to an end of each of the first and second resistors that is not connected to the magnetic head.

According to such features, the output terminal of the recording system and the input terminal of the reproducing system are directly connected and the direct current voltages thereof are the same, so that unlike the conventional apparatus, it is unnecessary to use a direct current cutting off capacitor. Therefore, the changeover between recording and reproduction is not delayed by the transient phenomenon of the capacitor and a high speed changeover is realized.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 4:
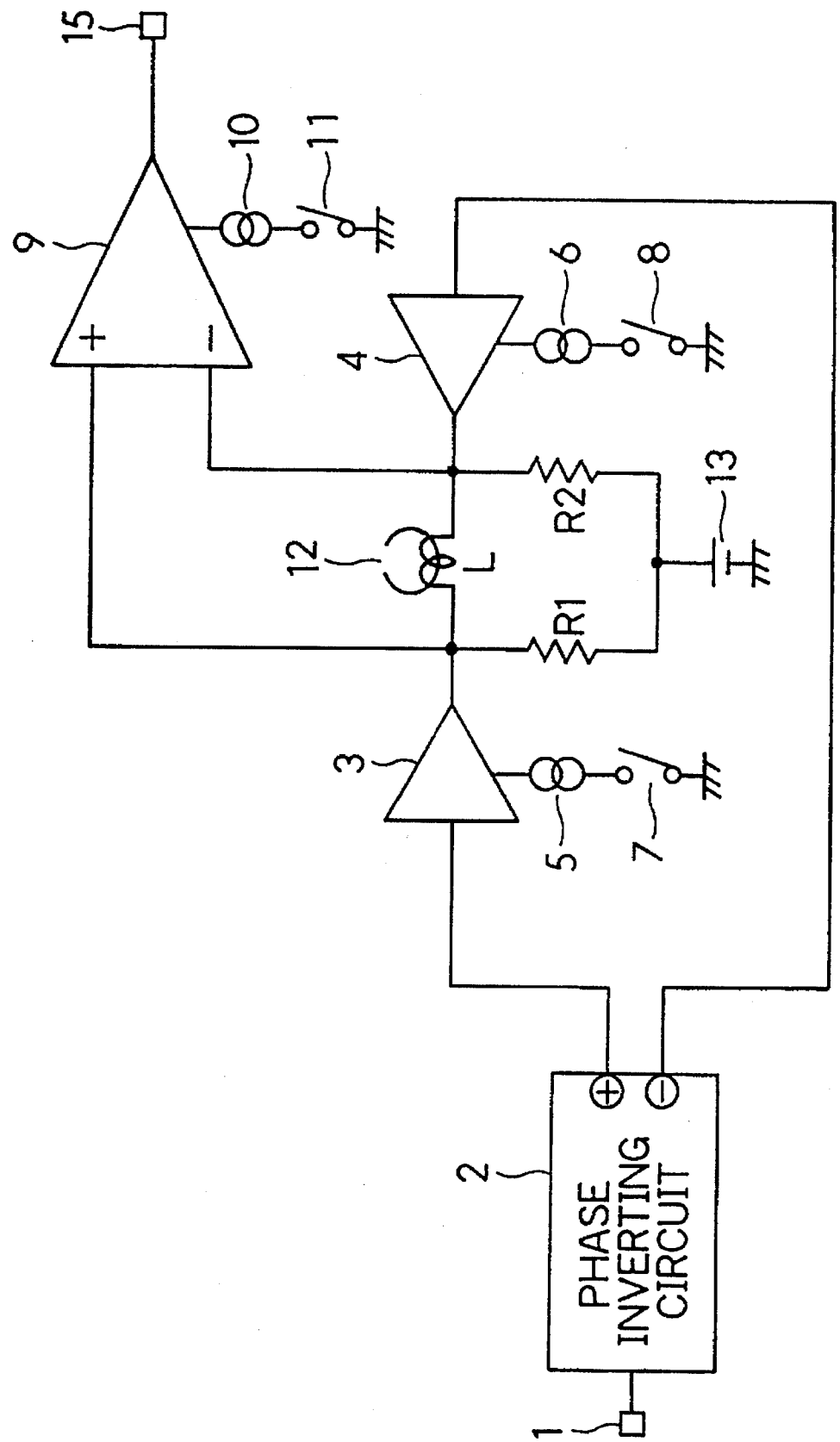
FIG. 4 is a circuit diagram of a relevant portion of a magnetic recording and reproducing apparatus embodying the present invention.

Hereinafter, an embodiment shown in the drawings will be described. This embodiment is directed to a video tape recorder which performs recording and reproduction of a magnetic tape according to a helical scanning method. Referring to FIG. 4, reference numeral 1 represents a recording signal input terminal and reference numeral 2 represents a phase inverting circuit which outputs a recording signal as it is and also inverts the phase of a recording signal to output a recording signal of opposite phase. Reference numerals 3 and 4 are first and second recording amplifiers, respectively. To the first recording amplifier 3, a recording signal having its phase not inverted is input. To the second recording amplifier 4, a recording signal having its phase inverted is input.

The recording currents output from the recording amplifiers 3 and 4 are differential and flow alternately from one side to the other and vice versa through a coil L of a magnetic head apparatus 12 used for both recording and reproduction. The recording circuit of such an arrangement is conventionally used as a BTL-type recording circuit. The magnetic head apparatus 12 may include only a magnetic head or may include a magnetic head and a rotary transformer.

Both ends of the magnetic head apparatus 12 are directly connected to a reproduction input amplifier 9. To the both ends of the magnetic head apparatus 12, the same bias voltage is supplied from a bias source 13 by way of resistors R1 and R2. Reference numeral 15 represents a reproduction output terminal. Reference numerals 5, 6 and 10 represent constant current sources provided at the first recording amplifier 3, the second recording amplifier 4 and the reproduction input amplifier 9, respectively. To the constant current sources 5, 6 and 10, changeover switches 7, 8 and 11 are connected. During recording, the switches 7 and 8 are ON and the switch 11 is OFF. During reproduction, the switches 7 and 8 are OFF and the switch 11 is ON.

Figure 1:
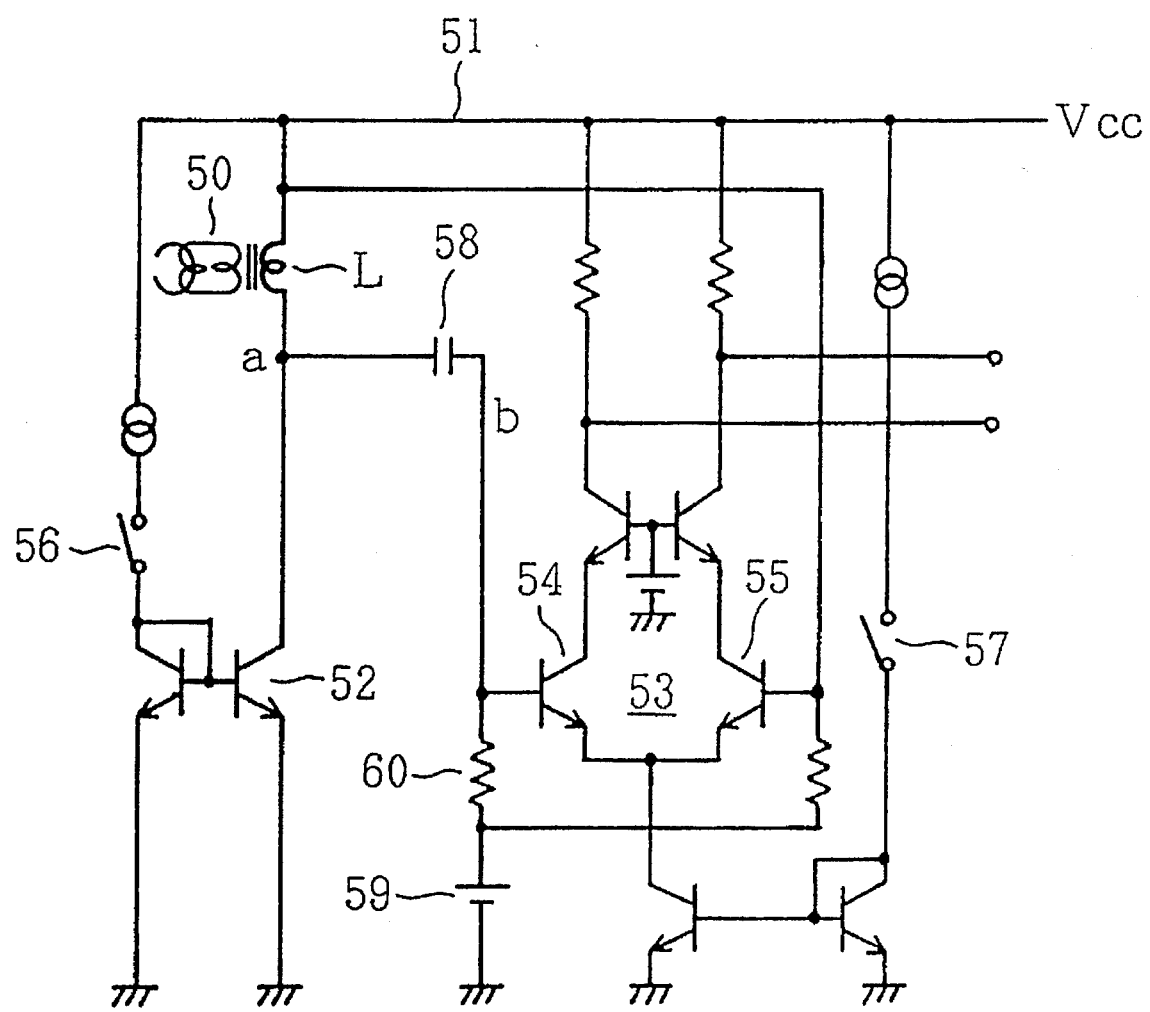
FIG. 1 is a circuit diagram of a relevant portion of a conventional a magnetic recording and reproducing apparatus.
Figure 2:
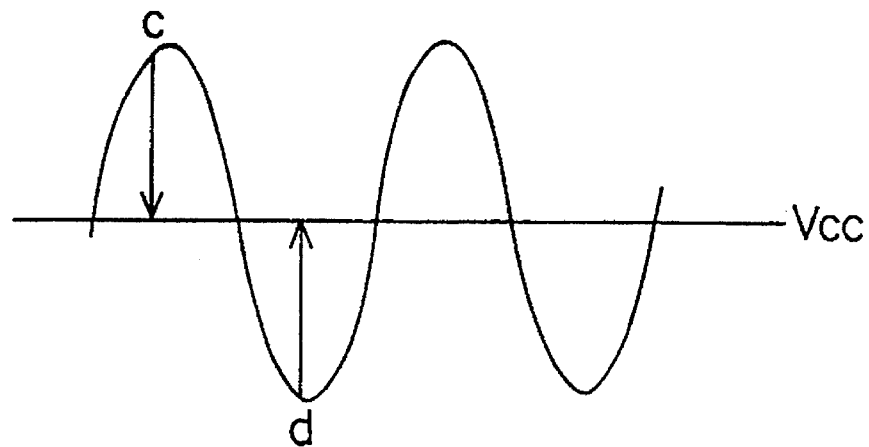
FIG. 2 is a view of assistance in explaining a problem of the conventional apparatus.
Figure 3:
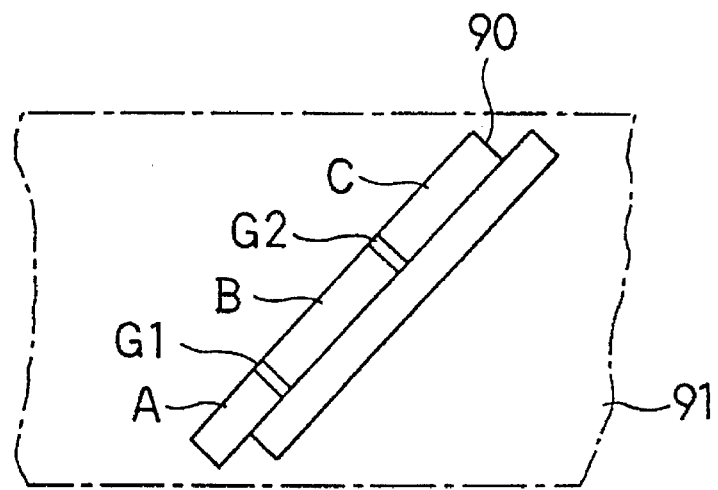
FIG. 3 is a view of assistance in explaining an example of a recording format employing the present invention.

Consider now the changeover from recording to reproduction. When the changeover is made while the recording current is flowing, since no capacitor is present, it hardly takes time for the voltage at the both ends of the magnetic head apparatus 12 to reach the bias voltage. This applies to the changeover from reproduction to recording. Thus, the recording and reproducing apparatus according to the present invention can suitably be used in a VTR of the type as shown in FIG. 3 since the speed of the changeover between recording and reproduction is high.

The resistors R1 and R2 supply a bias to the both ends of the magnetic head apparatus 12 during reproduction and function as the damping resistor during recording. The function as the damping resistor will be described. The first and second recording amplifiers 3 and 4 drive the magnetic head apparatus 12 with currents. The higher the frequency of the current flowing through the coil L of the magnetic head apparatus 12 is, the higher the impedance of the magnetic head apparatus 12 is. Therefore, if the frequency becomes very high, the amplitude of the voltage at the both ends of the magnetic head apparatus 12 becomes extremely high, so that the signal is distorted.

According to this embodiment, however, since the resistors R1 and R2 are present at the both ends of the magnetic head apparatus 12, the impedance of the both ends of the magnetic head apparatus 12 does not exceed the resistance (R1+R2). This is the damping effect by the resistors R1 and R2. This damping improves the recording characteristic at a high frequency.

Figure 5:
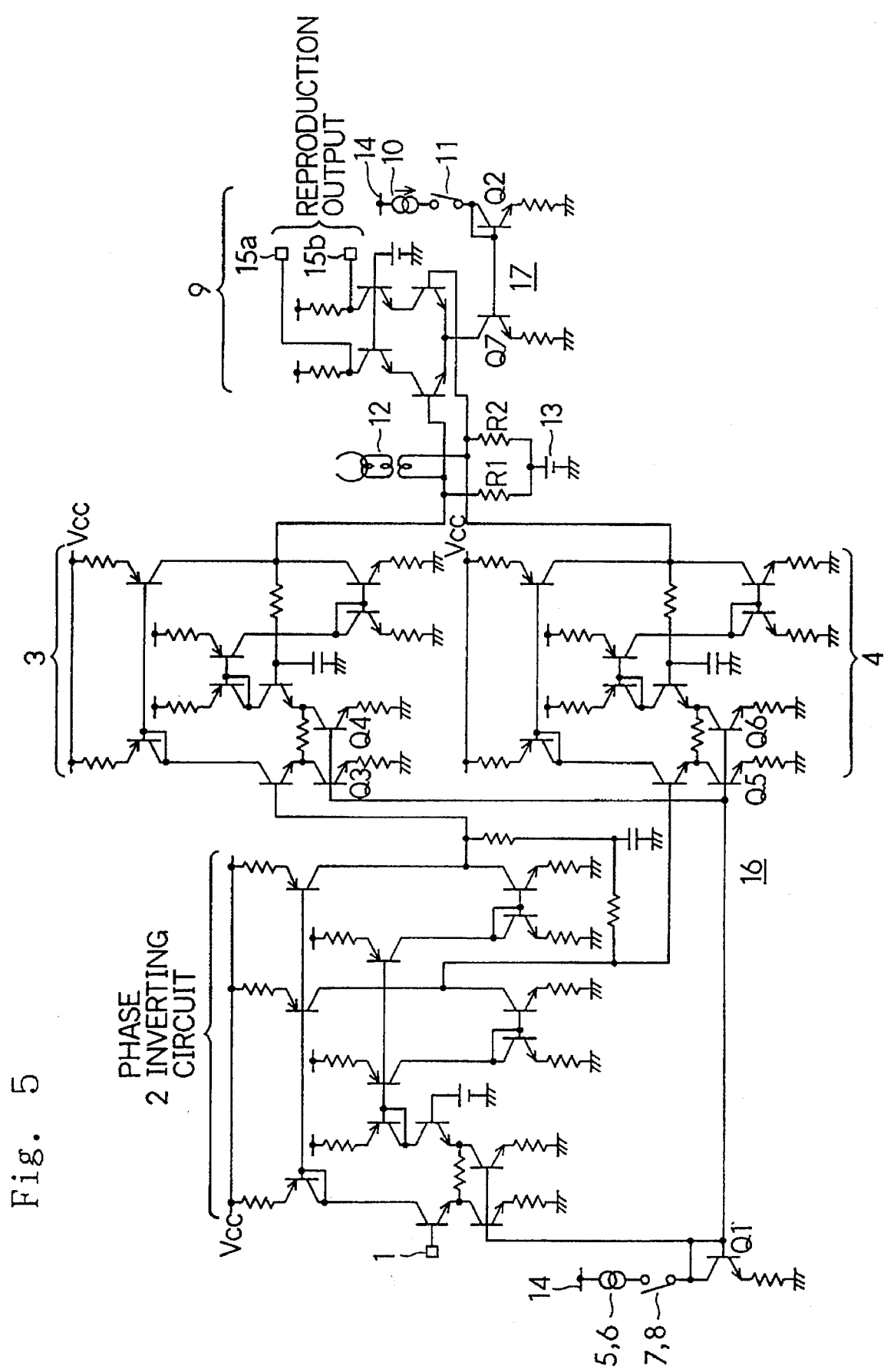
FIG. 5 is a detailed circuit diagram of the apparatus of FIG. 4.

Referring to FIG. 5, there is shown a more specific arrangement of the circuit of FIG. 4. In this arrangement, the functions of both the switches 7 and 8 are performed by one switch connected to a power line 14 and to the collector of an input side transistor Q1 of a current mirror circuit 16 constituting a constant current source for differential amplifiers in the recording amplifiers 3 and 4. The changeover switch 11 is connected to the power line 14 and to the collector of an input side transistor Q2 of a current mirror circuit 17 constituting a constant current source for differential amplifiers in the reproduction input amplifier 9. The current mirror circuit 16 is constituted by the transistors Q1 and Q3 to Q6. The current mirror circuit 17 is constituted by the transistors Q2 and Q7.

Needless to say, the present invention may be employed not only in the magnetic recording and reproducing apparatus of the format as shown in FIG. 3 but also in a magnetic recording and reproducing apparatus of a format as that of the normal VTR.

As described above, according to the present invention, a high-speed changeover between recording and reproduction is realized with a simple arrangement. The resistors which supply a bias to each end of the magnetic head apparatus function as the damping resistor between the both ends of the magnetic head apparatus during recording, so that the recording with a recording signal at a high frequency is excellently performed.

Obviously, many modifications and variations of the present invention are possible in light of the above teachings. It is therefore to be understood that within the scope of the appended claims, the invention may be practiced other than as specifically described.

What is claimed is:

1. A magnetic recording and reproducing apparatus comprising:

a magnetic head apparatus used for both recording and reproduction;

first recording signal supplying means for supplying a recording signal to a first end of the magnetic head apparatus;

second recording signal supplying means for supplying, to a second end of the magnetic head apparatus, a recording signal of a phase opposite to a phase of the recording signal supplied to the first end of the magnetic head apparatus;

a reproduction input amplifier connected to the first and second ends of the magnetic head apparatus;

a first resistor connected to the first end of the magnetic head apparatus;

a second resistor connected to the second end of the magnetic head apparatus, said second resistor having a resistance value a same as a resistance value of the first resistor;

bias voltage source connected to an end of each of the first and second resistors that is not connected to the magnetic head apparatus, wherein said first and second recording signal supplying means each include a recording amplifier comprising a first differential amplifier, output terminals of said recording amplifiers being respectively connected to the first and second ends of the magnetic head apparatus, and wherein said reproduction input amplifier comprises a second differential amplifier, the first ends of said first and second resistors being connected to a pair of input terminals of said second differential amplifier to supply thereto bias voltages from the bias voltage source; and changeover means is provided for turning on constant current sources of said first differential amplifiers for recording and turning off a constant current source of said second differential amplifier for reproduction during recording and for turning off the constant current source of the first differential amplifiers for recording and turning on the constant current source of the second differential amplifier during reproduction.

2. A magnetic recording and reproducing apparatus according to claim 1, wherein changeover between recording and reproduction is performed at a speed of 40 µs or lower.

3. A magnetic recording and reproducing apparatus according to claim 1, wherein said first and second resistor and said bias voltage source are active both during recording and reproduction.

4. A magnetic recording and reproducing apparatus according to claim 1, wherein recording and reproduction of a tape-form recording medium is performed according to a helical scanning method.

5. A magnetic recording and reproducing apparatus according to claim 4, wherein a sound signal recording area and a video signal recording area are provided on a recording track of a magnetic tape with a predetermined distance between, wherein the changeover between recording and reproduction is performed during a period corresponding to the predetermined distance, and wherein the recording and reproduction are performed by said magnetic head apparatus.

6. A magnetic recording and reproducing apparatus according to claim 5, wherein said changeover is performed on an order of approximately 10 µs.

7. A magnetic recording and reproducing apparatus according to claim 1, wherein each of said constant current sources is an output transistor of a current mirror circuit, each constant current source being turned on and off by turning on and off a current supplied to an input transistor of the corresponding current mirror circuit.

* * * * *